US009465496B2

(12) United States Patent
Mu et al.

(10) Patent No.: US 9,465,496 B2
(45) Date of Patent: Oct. 11, 2016

(54) CAPACITIVE IN-CELL TOUCH PANEL AND DISPLAY DEVICE

(71) Applicants: BOE TECHNOLOGY GROUP CO., LTD., Beijing (CN); HEFEI BOE OPTOELECTRONICS TECHNOLOGY CO., LTD., Hefei, Anhui (CN)

(72) Inventors: Suzhen Mu, Beijing (CN); Ming Hu, Beijing (CN)

(73) Assignees: BOE TECHNOLOGY GROUP CO., LTD., Beijing (CN); HEFEI BOE OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 0 days.

(21) Appl. No.: 14/357,905

(22) PCT Filed: May 16, 2013

(86) PCT No.: PCT/CN2013/075704
§ 371 (c)(1),
(2) Date: May 13, 2014

(87) PCT Pub. No.: WO2014/131248
PCT Pub. Date: Sep. 4, 2014

(65) Prior Publication Data
US 2015/0220174 A1      Aug. 6, 2015

(30) Foreign Application Priority Data

Mar. 1, 2013    (CN) .......................... 2013 1 0066016

(51) Int. Cl.
*G06F 3/045*         (2006.01)
*G06F 3/044*         (2006.01)
*G06F 3/041*         (2006.01)

(52) U.S. Cl.
CPC .............. *G06F 3/044* (2013.01); *G06F 3/0412* (2013.01); *G06F 3/0416* (2013.01); *G06F 2203/04112* (2013.01)

(58) Field of Classification Search
CPC .................... G06G 3/044; G06F 2203/04111; G06F 2203/04112

USPC ......................................................... 345/174
See application file for complete search history.

(56) References Cited

U.S. PATENT DOCUMENTS

2008/0164076 A1* 7/2008 Orsley ........................ 178/18.01
2011/0043466 A1    2/2011 Kim et al.
(Continued)

FOREIGN PATENT DOCUMENTS

CN      102053765 A      5/2011
CN      102768604 A     11/2012
(Continued)

OTHER PUBLICATIONS

First Office Action (Chinese language) issued by the State Intellectual Property Office of the People's Republic of China ("SIPO") for the priority Chinese application No. 201300660168, issued on May 29, 2015; 10 pages.

(Continued)

*Primary Examiner* — Jonathan Blancha (57) ABSTRACT

The embodiments of the present invention disclose a capacitive in-cell touch panel and a display device, which are configured so that the entirety of a common electrode layer in an array substrate is divided into a plurality of touch sensing electrodes and a plurality of touch driving electrodes insulated from each other; at least one data signal line is used through time division multiplex access as a touch read signal line, thus production cost is saved and production efficiency is improved; and the respective touch read signal line is connected with a corresponding touch sensing electrode through at least one signal switch unit. During a display period, the touch driving electrodes and the touch sensing electrodes are applied with a common electrode signal to achieve a normal display function; and during a touch period, the touch driving electrodes are applied with a touch scan signal, and the signal switch units are switched on, through which the touch scan signal coupled with the touch sensing electrodes is outputted to the touch read signal line.

19 Claims, 6 Drawing Sheets

(56) References Cited

U.S. PATENT DOCUMENTS

2012/0262410 A1* 10/2012 Lim .............................. 345/174
2013/0050130 A1* 2/2013 Brown .......................... 345/174
2014/0111471 A1 4/2014 Zhao

FOREIGN PATENT DOCUMENTS

CN  102841718 A  12/2012
CN  203084701 U  7/2013

OTHER PUBLICATIONS

English translation of the First Office Action issued by SIPO for the priority Chinese application No. 20130066016.8, issued on May 29, 2015; 9 pages.
English Abstract of CN102841718A; 1 pg.
English Abstract of CN102768604A; 2 pgs.
English Abstract of CN102053765A; 1 pg.
English Abstract of CN203084701U; 1 pg.
Second Office Action (Chinese language) issued by the State Intellectual Property Office of the People's Republic of China ("SIPO") for the priority Chinese application No. 20130066016.8, issued on Nov. 30, 2015; 7 pages.
English translation of the First Office Action issued by SIPO for the priority Chinese application No. 20130066016.8, issued on Nov. 30, 2015; 6 pages.
Second Office Action (Chinese language) issued by the State Intellectual Property Office of the People's Republic of China ("SIPO") for the priority Chinese application No. 201310066016.8, issued on Nov. 30, 2015; 7 pages.
English translation of the Second Office Action issued by SIPO for the priority Chinese application No. 201310066016.8, issued on Nov. 30, 2015; 6 pages.

* cited by examiner

CAPACITIVE IN-CELL TOUCH PANEL AND DISPLAY DEVICE

CROSS REFERENCE TO RELATED APPLICATIONS

This application is based on International Application No. PCT/CN2013/075704 filed on May 16, 2013, which claims priority to Chinese National Application No. 201310066016.8 filed on Mar. 1, 2013. The entire contents of each and every foregoing application are incorporated herein by reference.

TECHNICAL FIELD

Embodiments of the present invention relates to a capacitive in-cell touch panel and a display device.

BACKGROUND

With fast developments of display technologies, touch panels have been gradually popularized in people's life. Currently, according to constituting structures, the touch panels can be divided into an add-on mode touch panel, an on-cell touch panel and an in-cell touch panel. For the add-on mode touch panel, the touch panel and the LCD (liquid crystal display) are separately produced and then laminated together to form a liquid crystal display panel having a touch function. However, the add-on mode touch panel has disadvantages of high production cost, low light transmittance, thick modules and etc. For the in-cell touch panel, the touch electrodes of the touch panel are embedded in the liquid crystal display, thus the overall thickness of the modules can be reduced, the production cost of the touch panel is also greatly lowered, and therefore, it is popular with panel producers.

Currently, the capacitive in-cell touch panel has many design solutions. Usually, a touch driving electrode and a touch sensing electrode are provided within a liquid crystal box so that a coupling capacitance is formed between the touch driving electrode and the touch sensing electrode. When a human body contacts the touch panel, the electric field of the human body affects the capacitance value of a mutual capacitance, and then changes a voltage signal coupled by the touch sensing electrode. The position of a touch point can be determined according to the changes of the voltage signal. To achieve the structure design of the above capacitive in-cell touch panel, usually touch read signal lines corresponding to the touch sensing electrodes need to be individually provided within a TFT array substrate, touch scan signal lines corresponding to the touch driving electrodes need to be individually provided, which result in bringing new procedures during the production process, and then increase the production cost and do not help improve production efficiency. Also, the structure design of the above capacitive in-cell touch panel requires two drive chips (IC) used at the same time to respectively control the touch read signal lines and normal display-purpose signal lines (such as data signal lines), thus the cost is high.

SUMMARY

The embodiments of the present invention provide a capacitive in-cell touch panel and a display device, to achieve a capacitive in-cell touch panel with a low cost.

The capacitive in-cell touch panel provided by the embodiments of the present invention comprises a thin film transistor TFT array substrate comprising a plurality of data signal lines and a common electrode layer.

The common electrode layer comprises a plurality of touch sensing electrodes and a plurality of touch driving electrodes insulated from each other;

at least one data signal line is used as a touch read signal line during a touch period, a plurality of signal switch units are provided in the array substrate, and the respective touch read signal line is connected with a corresponding touch sensing electrode through at least one of the signal switch units;

during a display period, the touch driving electrodes and the touch sensing electrodes are applied with a common electrode signal; and during the touch period, a touch scan signal is applied to the touch driving electrodes, and the signal switch units are switched on, through the signal switch units which are switched on, the touch scan signal coupled by the touch sensing electrodes is outputted to the touch read signal line.

The display device provided by the embodiments of the present invention comprises the capacitive in-cell touch panel provided by the embodiments of the present invention.

The embodiments of the present invention achieve the following advantageous effects.

The capacitive in-cell touch panel and the display device provided by the embodiments of the present invention are configured so that the entirety of the common electrode layer in the array substrate is divided to form touch sensing electrodes and touch driving electrodes insulated from each other, at least one data signal line in the array substrate is used as a touch read signal line, and the respective touch read signal line is connected with a corresponding touch sensing electrode through at least one signal switch unit. During the display period, the touch driving electrodes and the touch sensing electrodes are applied with a common electrode signal to achieve a normal display function; and during the touch period, a touch scan signal is applied to the touch driving electrodes, and the signal switch units are switched on, through the signal switch units which are switched on, the touch scan signal coupled with the touch sensing electrodes is outputted to the touch read signal line, thus the touch function is achieved. As the data signal line is used in a way of time division multiplex access and can be as the touch read signal line to receive the voltage signal coupled by the touch sensing electrodes to achieve touch function, based on the current fabricating process of the array substrate, the touch panel can be made without additional processes, thus the production cost is saved and the production efficiency is increased. Also, using the data signal line as the touch read signal line can avoid adding the IC for separately controlling the touch read signal line, and the production cost is saved.

BRIEF DESCRIPTION OF THE DRAWINGS

In order to clearly illustrate the technical solutions of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention more apparent, the technical solutions of the embodiments will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Unless otherwise defined, the technical terms or scientific terms used herein should be the general meanings understood by one having ordinary skills in the field of the present invention. The terms "first", "second" and similar terms used in the description and claims of the present application for a patent for invention do not represent any order, amount or importance, while are just used to differentiate different constituting parts. Likewise, the terms "one", "a" and similar terms do not represent limitation on amount while refer to at least one. Similar terms such as "including" or "containing" refer to that an element or article preceding the terms "including" or "containing" covers the elements, articles and equivalents thereof listed after the terms "including" or "containing", and do not exclude other elements or articles. Similar terms such as "connect" or "couple" are not limited to physical or mechanical connections, and can comprise electrical connection, no matter direct or indirect. Terms such as "upper", "lower", "left" and "right" are only intended to represent relative position relationships, when the absolute position of a described object is changed, the relative position relationships may be changed correspondingly.

The specific implementation manners of the capacitive in-cell touch panel and the display device provided by the embodiments of the present invention will be detailed hereinafter in connection with the drawings.

The thicknesses and shapes of the films in the drawings do not reflect the true ratio of the array substrate, and are only intended to schematically describe the contents of the embodiments of the present invention.

The capacitive in-cell touch panel provided by the embodiment of the present invention comprises an array substrate comprising data signal lines and a common electrode layer;

the common electrode layer comprises a plurality of touch sensing electrodes and a plurality of touch driving electrodes insulated from each other;

at least one data signal line is used as a touch read signal line during a touch period, a plurality of signal switch units are provided in the array substrate, and the respective touch read signal line is connected with a corresponding touch sensing electrode through at least one of the signal switch units;

during a display period, a common electrode signal is applied to the touch driving electrodes and the touch sensing electrodes; and during the touch period, a touch scan signal is applied to the touch driving electrodes, and the signal switch units are switched on, through the signal switch units which are switched on, the touch scan signal coupled by the touch sensing electrodes is outputted to the touch read signal line.

Furthermore, during the display period, applying the common electrode signal to the touch sensing electrodes can be achieved in the following way: a gray level signal and a common electrode signal are applied to the data signal lines in a time division way, when the common electrode signal is applied to the data signal lines, the common electrode signal applied to the data signal lines are outputted to the touch sensing electrodes through the signal switch units which are switched on.

The above capacitive in-cell touch panel provided by the embodiments of the present invention uses the data signal line in a way of time division multiplex access, which is used as the touch read signal line to receive the voltage signal coupled by the touch sensing electrodes to achieve touch function, therefore, based on the current fabricating process of the array substrate, the touch panel can be made without additional processes, thus the production cost is saved and the production efficiency is increased. Also, using the data signal line as the touch read signal line can avoid adding the IC for separately controlling the touch read signal line, that is, using the current IC controlling the data signal lines can achieve the touch function, thus the production cost is saved.

Specifically, for the capacitive touch panel provided by the embodiments of the present invention, the entirety of the common electrode layer in the array substrate is divided to form the touch sensing electrodes and the touch driving electrodes insulated from each other, during specific implementation, the respective touch sensing electrodes formed with the common electrode layer usually extend along the column direction of the pixel units in the array substrate, and the respective touch driving electrodes usually extend along the row direction of the pixel units in the array substrate; or, the respective touch sensing electrodes formed with the common electrode layer usually extend along the row direction of the pixel units in the array substrate, and the respective touch driving electrodes usually extend along the column direction of the pixel units in the array substrate. Of course, the touch sensing electrodes and the touch driving electrodes can also extend along other directions which are not defined herein.

The following description is made taking it as an example that the respective touch sensing electrodes extend along the column direction of the pixel units in the array substrate and the respective touch driving electrodes extend along the row direction of the pixel units in the array substrate.

Figure 1:
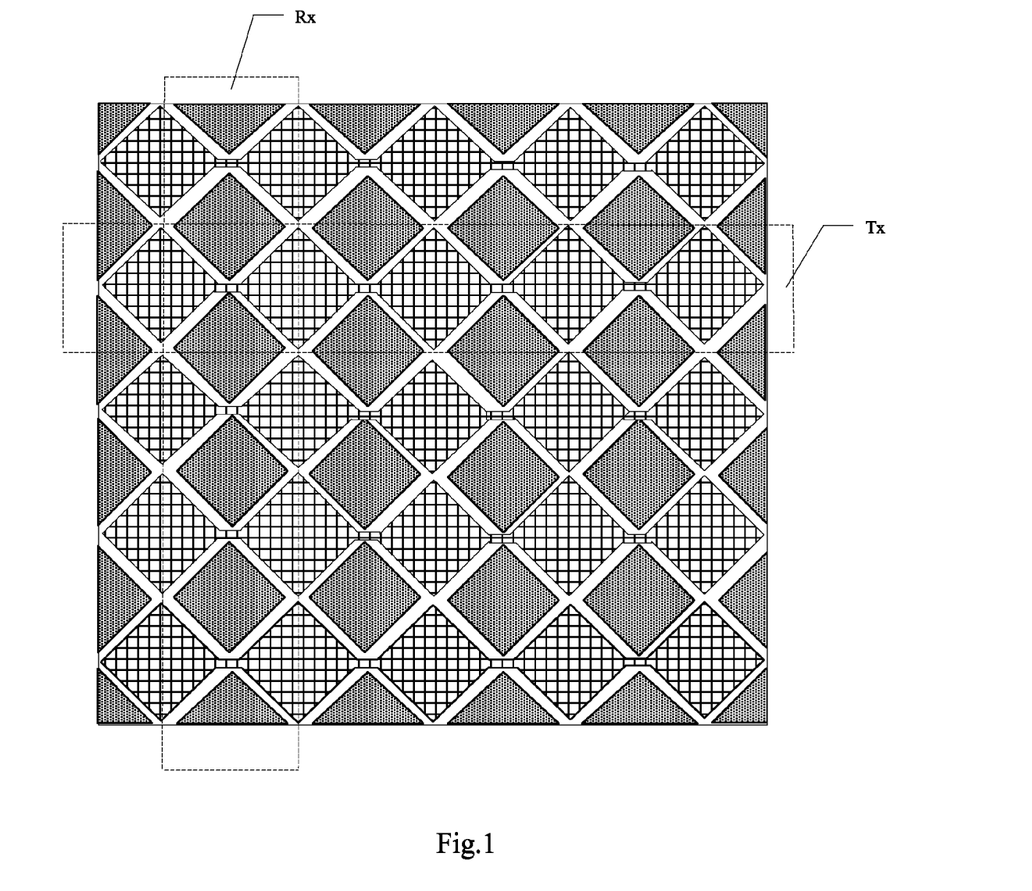
FIG. 1 is a schematic diagram of a common electrode layer graph in the touch panel provided by the embodiment of the present invention.
Figure 2:
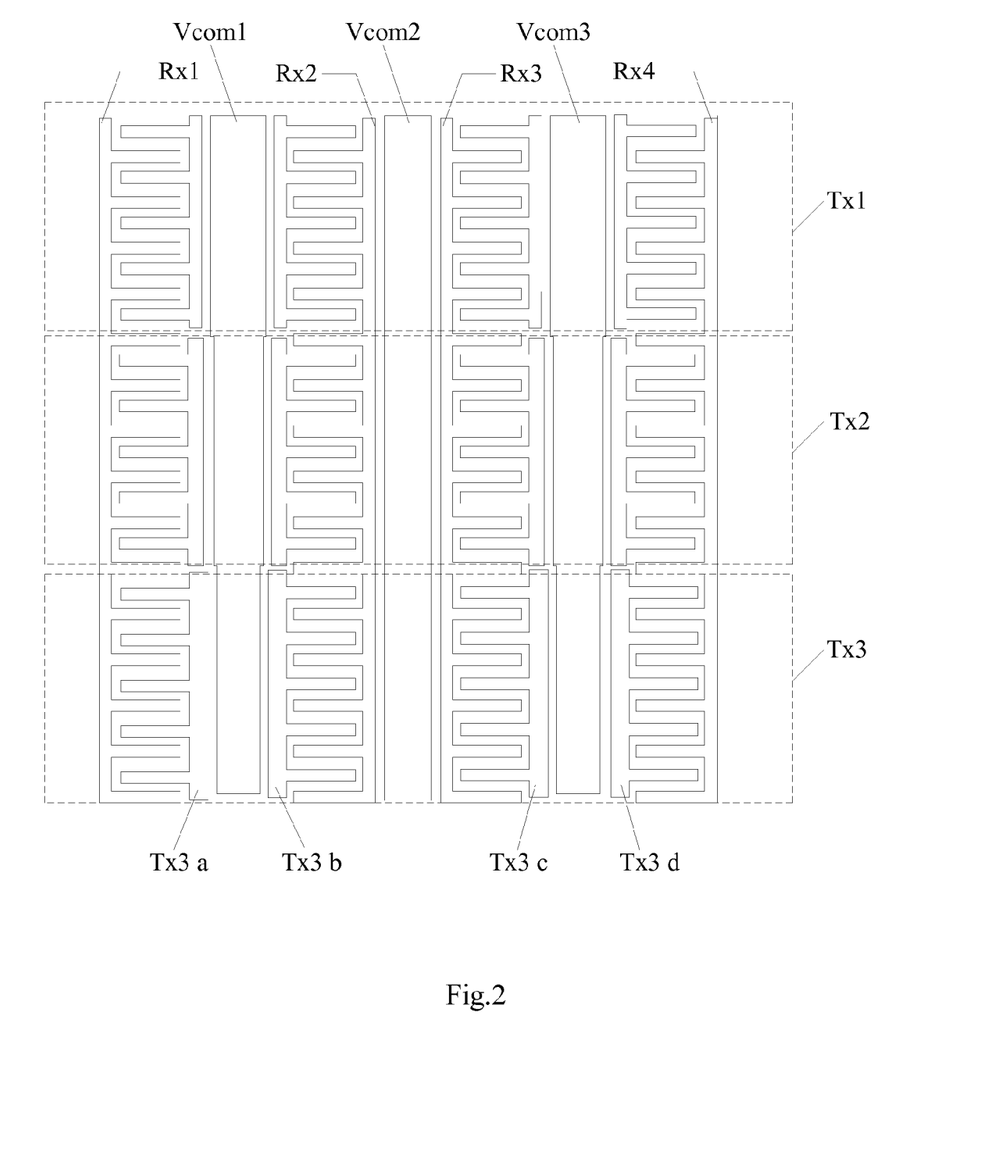
FIG. 2 is another schematic diagram of the common electrode layer graph in the touch panel provided by the embodiment of the present invention.
Figure 3:
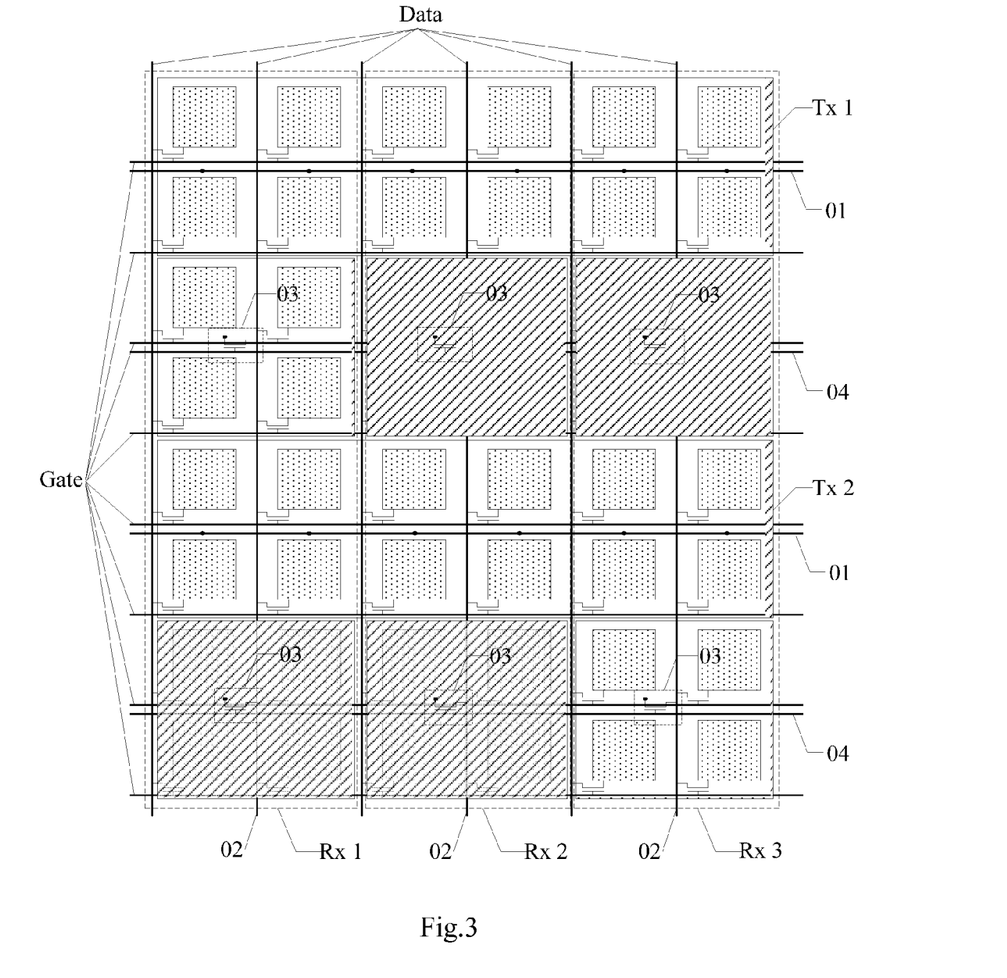
FIG. 3 is a schematic diagram of the structure of the second embodiment of the present invention.

Specifically, the touch driving electrodes and the touch sensing electrodes provided in the common electrode layer can be diamond-shaped electrodes (as shown in FIG. 1), interdigitated electrodes (as shown in FIG. 2) or strip-shaped electrodes (as shown in FIG. 3). The interdigitated electrodes refer to alternatively arranged comb structures at the sides where the touch driving electrodes face the touch sensing electrodes. The touch sensing electrodes Rx shown in FIGS. 1 to 3 are wired in the column direction of the array substrate in the drawings, and the touch driving electrodes Tx are wired in the row direction of the array substrate in the drawings. As the touch sensing electrodes Rx and the touch driving electrodes Tx are provided at the same layer, the respective touch sensing electrodes are divided into a plurality of touch sensing sub-electrodes which are insulated from each other. For example, among the diamond-shaped electrodes shown in FIG. 1, six touch sensing sub-electrodes constitute one touch sensing electrode Rx, among the strip-shaped electrodes shown in FIG. 3, two touch sensing sub-electrodes constitute one touch sensing electrode Rx. The respective touch driving electrodes are divided into a plurality of touch driving sub-electrodes which are insulated from each other. For example, among the interdigitated electrodes shown in FIG. 2, four touch driving sub-electrodes constitute a touch driving electrode Tx, i.e., Tx3a, Tx3b, Tx3c and Tx3d in FIG. 2 constitute Tx3.

For example, as shown in FIG. 3, a plurality of touch driving signal lines 01 can be provided in the array substrate and between adjacent pixel units in the TFT array substrate, and each touch driving electrode Tx is in electrical connection with at least one touch driving signal line 01, for example, as shown in FIG. 3, they are in electrical connection through a plurality of via holes. The touch driving signal lines 01 serve to output the common electrode signal to the touch driving electrodes Tx through the touch driving signal lines 01 connected with the touch driving electrodes during the display period of one frame, and to output the touch scan signal to the touch driving electrodes Tx through the touch driving signal lines 01 connected with the touch driving electrodes during the touch period of one frame. Generally, the signal can be applied to the respective touch driving signal lines 01 at the same time.

Further, if the respective touch driving electrodes Tx are divided into a plurality of touch driving sub-electrodes which are insulated from each other, that is, the respective touch driving electrodes are constituted by a plurality of touch driving sub-electrodes insulated from each other, one touch driving signal line can be used to connect the touch driving sub-electrodes constituting the same touch driving electrode, so as to input the common electrode signal or the touch scan signal to it in a time division way, that is, each touch driving electrode is electrically connected with one touch driving signal line; the touch driving sub-electrodes constituting the same touch driving electrode can be separately provided with a touch driving signal line, so as to input the common electrode signal or the touch scan signal to it in a time division way, that is, each touch driving electrode is eclectically connected with a plurality of touch driving signal lines, which is not defined herein.

Furthermore, when the touch driving signal lines 01 are provided, as shown in FIG. 3, the touch driving signal lines 01 can be designed to have the same wiring direction with the gate signal lines (Gate) in the array substrate. Of course, the touch driving signal lines can also be designed to have the same wiring direction with the data signal lines in the array substrate, which is not defined herein. However, during specific implementation, usually the wiring direction of the touch driving signal lines and the extending direction of the touch driving electrodes are provided in the same direction.

Thus, the touch driving signal lines can be provided at the same layer with the gate signal lines, no additional fabrication processes are required during producing the array substrate, and the graphs of the touch driving signal lines and the gate signal lines can be formed only through one patterning process, thus the production cost is saved and the additional value of the product is increased.

Usually, the precision of the touch panel is at a millimeter level, the density and width of the touch driving electrodes and the touch sensing electrodes can be selected according to a desired touch precision to ensure the desired touch precision, and usually the widths of the touch driving electrodes and the touch sensing electrodes are preferably controlled within the range of 5-7 mm. The precision of liquid crystal display is usually at a micrometer level. Therefore, usually one touch driving electrode and one touch sensing electrode cover a plurality of columns or rows of pixel units of the liquid crystal display. The precision in the embodiments of the present invention refers to the size of one touch unit of the touch panel or the size of the pixel unit of the display screen.

In the touch panel provided by the embodiments of the present invention, as one touch sensing electrode covers a plurality of columns of pixel units, thus, one touch sensing electrode usually covers the gaps between the plurality of columns of pixel units. Then, one touch sensing electrode may correspond to one data signal line as the touch read signal line, and may also correspond to a plurality of data signal lines as the touch read signal lines. For example, in FIG. 3, one touch sensing electrode Rx is constituted by two touch sensing sub-electrodes, each touch sensing electrode Rx covers two columns of pixel units, and one touch sensing electrode Rx corresponds to one data signal line (Data) as the touch read signal line 02. Also, one touch read signal line 02 may be connected with one touch sensing electrode Rx through one or more signal switch units 03.

Furthermore, as the common electrode layer is usually made of an ITO material, and the ITO material has a high resistance. After a touch read signal line made of metal is connected with one touch sensing electrode through a plurality of signal switch units, it is equivalent to connect in parallel the ITO electrode with the metal resistor constituted by a plurality of touch read signal lines, thus, the resistance of the touch sensing electrodes can be reduced to the maximum extent, and then the signal to noise ratio is increased when the electrodes deliver the signal.

Furthermore, as the precision of the touch panel is at the millimeter level, while the precision of liquid crystal display is at the micrometer level, when the touch sensing electrodes and the touch driving electrodes are provided, there will be a gap of several columns of pixel units between them. Thus, as shown in FIG. 2, in the common electrode layer, common electrodes Vcom can be provided at the gap between the touch sensing electrodes Rx and the touch driving electrodes Tx and the common electrodes Vcom are insulated from the touch sensing electrodes Rx and the touch driving electrodes Tx. The common electrodes Vcom are inputted with the common electrode signal in operation to ensure that the pixel units in the area corresponding to the common electrodes Vcom can display in normal state.

The specific structure connecting the touch read signal lines and the signal switch units of the touch sensing electrodes in the above touch panel will be detailed hereinafter through specific embodiments.

Embodiment 1

Figure 4:
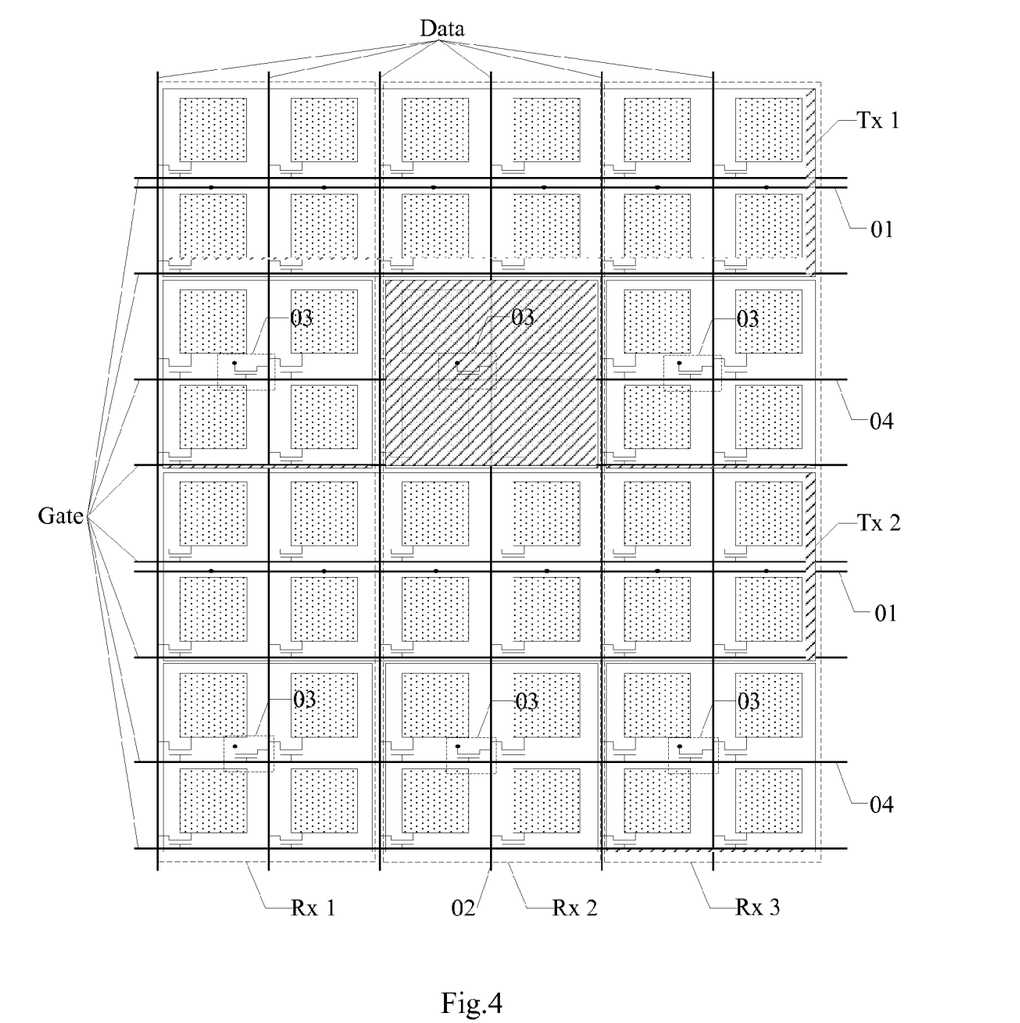
FIG. 4 is a schematic diagram of the structure of the first embodiment of the present invention.

Specifically, at least one gate signal line Gate in the array substrate can be used as the touch scan signal line 04 during the touch period; correspondingly, the signal switch units 03 can be P type TFT devices. As shown in FIG. 4, the source of the TFT device is electrically connected with the touch read signal line 02, and the drain is electrically connected with the touch sensing electrodes Rx, and the gate is electrically connected with the touch scan signal line 04. The TFT devices connecting the data signal lines Data and the pixel electrodes in the array substrate are usually N type TFT devices. The N type TFT devices turn on when the gate signal lines connected with them are applied with a high level signal (a voltage signal with a positive value), the P type TFT devices turn on when the gate signal lines connected with them as the touch scan signal lines are applied with a low level signal (a voltage signal with a negative value), and the P type TFT devices and the N type TFT devices usually do not turn on when the gate signal lines connected with them are applied with a voltage signal about 0V. Therefore, by way of the properties of the TFT devices, the gate signal lines are applied with different voltage signals to achieve individually turning on the N type TFT devices or the P type TFT devices that are connected with the gate signal lines.

For example, the P type TFT devices as the signal switch units may be a top gate structure or a bottom gate structure, which is not defined herein.

Figure 5:
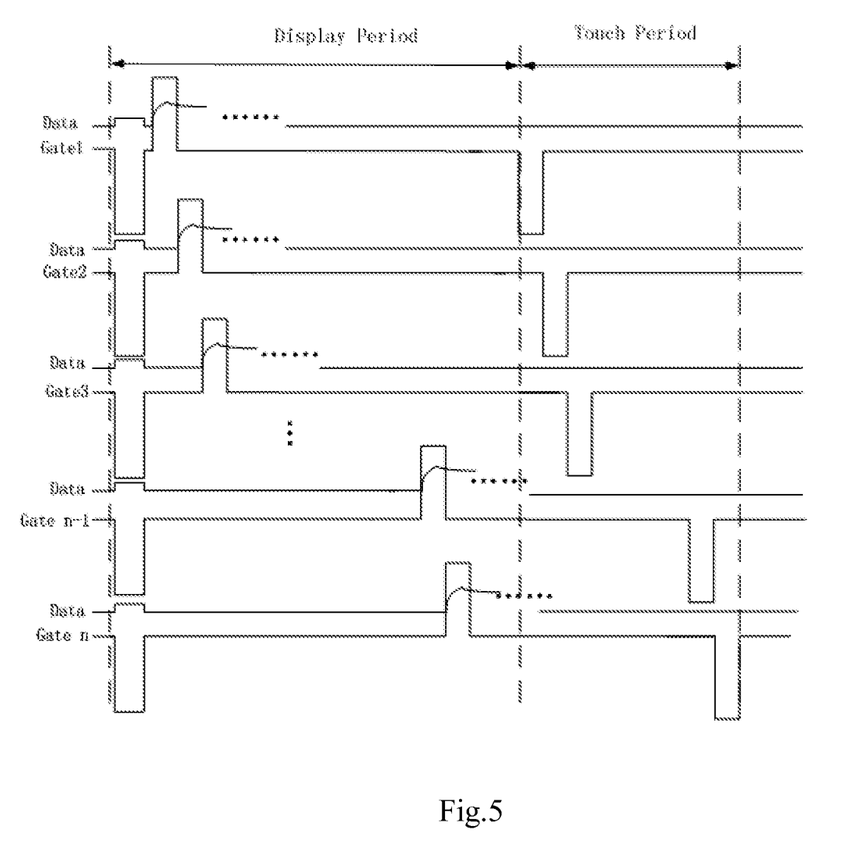
FIG. 5 is a schematic diagram of the time sequence of the first embodiment of the present invention.

When the signal switch units have the structure of embodiment 1, the drive time sequence of the above touch panel provided by the embodiments of the present invention is shown in FIG. 5, which is specifically as follow:

First, the time of displaying each frame (V-sync) by the touch panel is divided into a display period (Display) and a touch period (Touch). For example, the time of displaying one frame by the touch panel is 16.7 ms, in which 5 ms is selected as the touch period, and the other 11.7 ms is the display period. Of course, the periods of the two can be properly adjusted according to the processing ability of the IC chip, which is not defined herein.

During the display period (Display), as shown in FIG. 5, first, a low level of gate scan signal is applied to each of the gate signal lines Gate 1, Gate 2, . . . Gate n in the touch panel at the same time, the P type TFT devices are switched on, and meanwhile, the data signal lines Data are applied with the common electrode signal, and then the common electrode signal can be outputted to the touch sensing electrodes through the P type TFT devices which are switched on. Then, a high level of gate scan signal is sequentially applied to each of the gate signal lines Gate 1, Gate 2, . . . , Gate n in the touch panel, a gray level signal is applied to the data signal line Data, and normal display is achieved.

Of course, the high level of gate scan signal can be sequentially applied to each of the gate signal lines Gate 1, Gate 2, . . . Gate n in the touch panel, and also, the gate signal lines as the touch scan lines are applied with a low level of gate scan signal before or after being applied with the high level of gate scan signal, the P type TFT devices are switched on, the common electrode signal is applied to the data signal line Data at the same time, and the common electrode signal can be outputted to the touch sensing electrodes through the P type TFT devices which are switched on.

During the touch period (Touch), the IC chip connected with the touch driving electrodes provides the touch scan signal to the touch driving electrodes at the same time, meanwhile, the touch scan signal lines connected with the P type TFT devices are applied with the low level of gate scan signal to switch on the P type TFT devices (that is, the signal switch units), and the P type TFT devices which have been switched on are used to output the touch scan signal coupled by the touch sensing electrodes to the touch read signal lines so as to achieve the touch function.

Embodiment 2

As shown in FIG. 3, a plurality of touch scan signal lines 04 between adjacent pixel units in the TFT array substrate are added in the TFT array substrate.

Specifically, the signal switch units 03 are TFT devices, and can be P type TFT devices or N type TFT devices, which is not defined herein. The source of the TFT device is electrically connected with the touch read signal line 02, the drain electrode is electrically connected with the touch sensing electrodes Rx, and the gate electrode is electrically connected with the newly added touch scan signal lines 04. The added touch scan signal lines 04 are used to individually control the conduction situation of the signal switch units 03, that is, when the signal switch units 03 are P type TFT devices, the signal switch units are switched on when the touch scan signal lines 04 are applied with the low level signal; when the signal switch units 03 are N type TFT devices, the signal switch units 03 are switched on when the touch scan signal lines 04 are applied with the high level signal.

For example, the TFT devices as the signal switch units can be a top gate structure or a bottom gate structure, which is not defined herein.

Furthermore, for example, as shown in FIG. 3, the newly added touch scan signal lines 04 on the array substrate can have the same wiring direction with the gate signal lines (Gate) in the array substrate, and can also have the same wiring direction with the data signal lines (Data) in the array substrate, which is not defined herein. However, during specific implementation, the wiring direction of the touch scan signal lines and the extending direction of the gate signal lines usually are provided in the same direction.

Thus, the touch driving signal lines can be provided at the same layer with the gate signal lines, no additional fabrication processes are desired during producing the array substrate, and the patterns of the touch scan signal lines and the gate signal lines can be formed only through one patterning process, thus the production cost is saved and the additional value of the product is increased.

Figure 6:
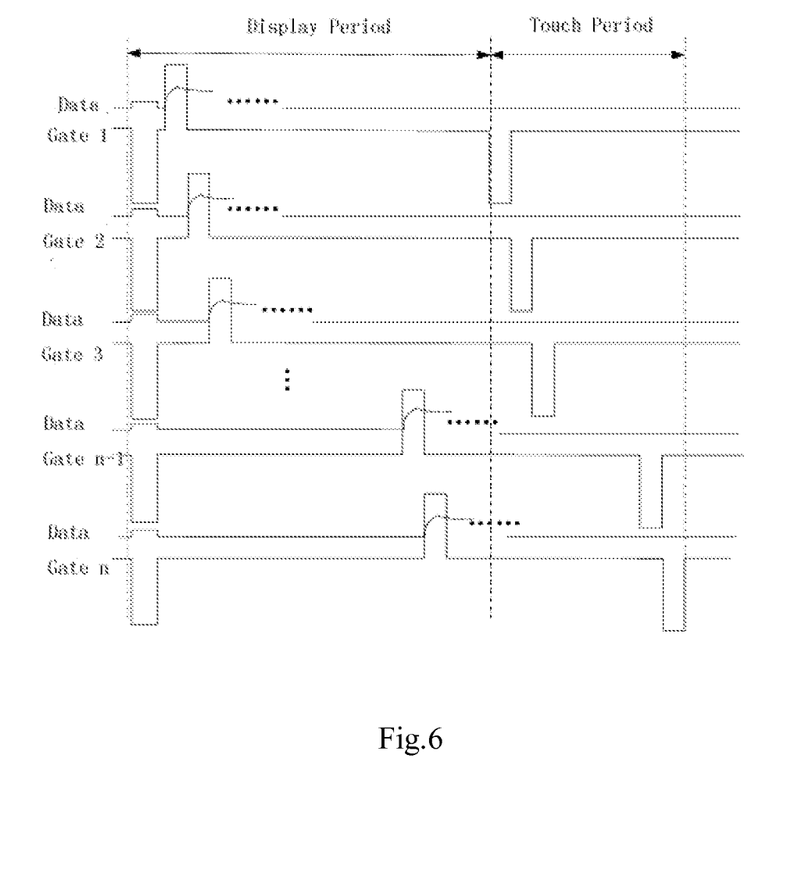
FIG. 6 is a schematic diagram of the time sequence of the second embodiment of the present invention.

When the signal switch units have the structure of embodiment 2, the drive time sequence of the above touch panel provided by the embodiments of the present invention is shown in FIG. 6.

First, the time of displaying each frame (V-sync) by the touch panel is divided into a display period (Display) and a touch period (Touch). For example, the time of displaying one frame by the touch panel is 16.7 ms, in which 5 ms is selected as the touch period, and the other 11.7 ms is the display period. Of course, the periods of the two can be adjusted according to the processing ability of the IC chip, which is not defined herein.

During the display period (Display), as shown in FIG. 6. First, a signal is applied to the touch scan signal lines M1, M2, . . . , Mn at the same time, then the signal switch units are switched on, and meanwhile, the data signal lines (Data) are applied with the common electrode signal, and then the common electrode signal can be outputted to the touch sensing electrodes through the signal switch units which are switched on. Then, a high level of gate scan signal is sequentially applied to the gate signal lines Gate 1, Gate 2, . . . , Gate n in the touch panel, a gray level signal is applied to the data signal lines (Data), and normal display is achieved.

Of course, the high level of gate scan signal can be sequentially applied to the gate signal lines Gate 1, Gate 2, . . . Gate n in the touch panel, and further, a time gap is reserved between the time during which the high level of gate scan signals are applied to adjacent rows of gate signal lines. The touch scan signal lines M1, M2, . . . , Mn are applied with a signal, the signal switch units are switched on, and the common electrode signal is applied to the data signal lines Data at the same time, and thus the common electrode signal can be outputted to the touch sensing electrodes through the P type TFT devices which are switched on.

During the touch period (Touch), the IC chip connected with the touch driving electrodes provides the touch scan signal to the touch driving electrodes, meanwhile, the touch scan signal lines M1, M2, . . . , Mn are sequentially applied with the signal to switch on the TFT devices connected with them and serving as the signal switch unit, and the signal switch units which have been switched on are used to output the touch scan signal coupled by the touch sensing electrodes to the touch read signal lines to achieve the touch function.

Based on the same inventive concept, the embodiments of the present invention further provide a display device comprising the above capacitive in-cell touch panel provided by the embodiments of the present invention, and the implementation of the display device can refer to the embodiments of the above capacitive in-cell touch panel and is omitted herein.

For the capacitive in-cell touch panel and the display device provided by the embodiments of the present invention, the entirety of the common electrode layer in the array substrate is divided to form touch sensing electrodes and touch driving electrodes insulated from each other, at least one data signal line in the array substrate is used as a touch read signal line, and the respective touch read signal line is connected with a corresponding touch sensing electrode through at least one signal switch unit. During the display period, the touch driving electrodes and the touch sensing electrodes are applied with the common electrode signal to achieve a normal display function; and during the touch period, the touch driving electrodes are applied with a touch scan signal, and the signal switch units are switched on, through which the touch scan signal coupled by the touch sensing electrodes is outputted to the touch read signal line, thus the touch function is achieved. As the data signal line is used in a way of time division multiplex access as the touch read signal line to receive the voltage signal coupled by the touch sensing electrodes to achieve touch function, based on the current fabricating process of the array substrate, the touch panel can be made without additional processes, thus the production cost is saved and the production efficiency is saved. Also, using the data signal line as the touch read signal line can avoid adding the IC for separately controlling the touch read signal line, and the production cost is saved.

Obviously one skilled in the art may make various modifications and variations to the present invention without departing from the spirits and scope of the present invention. Thus, if such variations and modifications fall within the scope of the claims of the present invention and equivalent technologies thereof, the present invention shall also contain such modifications and variations.

The invention claimed is:

1. A capacitive in-cell touch panel comprising an array substrate having a plurality of data signal lines and a common electrode layer, wherein a frame period for displaying each frame by the touch panel is divided into a display period and a touch period, and, wherein, the common electrode layer comprises a plurality of touch sensing electrodes and a plurality of touch driving electrodes insulated from each other;

at least one data signal line is used as a touch read signal line during a touch period, a plurality of signal switch units are provided in the array substrate, and the respective touch read signal line is connected with a corresponding touch sensing electrode through at least one of the signal switch units;

during a display period, the touch driving electrodes and the touch sensing electrodes are applied with a common electrode signal; and during the touch period, the touch driving electrodes are applied with a touch scan signal, the signal switch units are switched on, through the signal switch units which are switched on, the touch scan signal coupled by the touch sensing electrodes is outputted to the touch read signal line; and wherein, during the display period, the data signal lines are applied with a gray level signal and a common electrode signal in a time division way, and when the data signal lines are applied with the common electrode signal, the common electrode signal applied to the data signal lines is outputted to the touch sensing electrodes through the signal switch units which are switched on.

2. The touch panel according to claim 1, wherein, at least one gate signal line in the array substrate is used as the touch scan signal line during the touch period;

the signal switch units are P type TFT devices; wherein, the source of the TFT device is electrically connected with the touch read signal line, the drain is electrically connected with the touch sensing electrode, and the gate is electrically connected with the touch scan signal line.

3. The touch panel according to claim 1, wherein, the array substrate comprises a plurality of touch scan signal lines between adjacent pixel units in the array substrate;

the signal switch units are TFT devices; wherein, the source of the TFT device is electrically connected with the touch read signal line, the drain is electrically connected with the touch sensing electrode, and the gate is electrically connected with the touch scan signal line.

4. The touch panel according to claim 2, wherein, the touch scan signal lines and the gate signal lines of the array substrate have the same wiring direction.

5. The touch panel according to claim 3, wherein, the array substrate comprises a plurality of touch driving signal lines between adjacent pixel units in the array substrate, and each touch driving electrode is in electrical connection with at least one of the touch driving signal lines.

6. The touch panel according to claim 5, wherein, the touch driving signal lines and the gate signal lines of the array substrate have the same wiring direction.

7. The touch panel according to claim 1, wherein, the respective touch driving electrodes extend along the row direction of the pixel units in the array substrate, and the respective touch sensing electrodes extend along the column direction of the pixel units in the array substrate; or, the respective touch driving electrodes extend along the column direction of the pixel units in the array substrate, and the respective touch sensing electrodes extend along the row direction of the pixel units in the array substrate.

8. The touch panel according to claim 1, wherein, the touch driving electrodes and the touch sensing electrodes are diamond-shaped electrodes, interdigitated electrodes or strip-shaped electrodes.

9. The touch panel according to claim 1, wherein, common electrodes are provided at the gap of the common electrode layer between the touch sensing electrodes and the touch driving electrodes, and are insulated from the touch sensing electrodes and the touch driving electrodes.

10. A display device comprising the capacitive in-cell touch panel according to claim 1.

11. The display device according to claim 10, wherein, during the display period, the data signal lines are applied with a gray level signal and a common electrode signal in a time division way, and when the data signal lines are applied with the common electrode signal, the common electrode signal applied to the data signal lines is outputted to the touch sensing electrodes through the signal switch units which are switched on.

12. The display device according to claim 10, wherein, at least one gate signal line in the array substrate is used as the touch scan signal line during the touch period; the signal switch units are P type TFT devices; wherein, the source of the TFT device is electrically connected with the touch read signal line, the drain is electrically connected with the touch sensing electrode, and the gate is electrically connected with the touch scan signal line.

13. The display device according to claim 10, wherein, the array substrate comprises a plurality of touch scan signal lines between adjacent pixel units in the array substrate; the signal switch units are TFT devices; wherein, the source of the TFT device is electrically connected with the touch read signal line, the drain is electrically connected with the touch sensing electrode, and the gate is electrically connected with the touch scan signal line.

14. The display device according to claim 12, wherein, the touch scan signal lines and the gate signal lines of the array substrate have the same wiring direction.

15. The display device according to claim 13, wherein, the array substrate comprises a plurality of touch driving signal lines between adjacent pixel units in the array substrate, and each touch driving electrode is in electrical connection with at least one of the touch driving signal lines.

16. The display device according to claim 15, wherein, the touch driving signal lines and the gate signal lines of the array substrate have the same wiring direction.

17. The display device according to claim 10, wherein, the respective touch driving electrodes extend along the row direction of the pixel units in the array substrate, and the respective touch sensing electrodes extend along the column direction of the pixel units in the array substrate; or, the respective touch driving electrodes extend along the column direction of the pixel units in the array substrate, and the respective touch sensing electrodes extend along the row direction of the pixel units in the array substrate.

18. The display device according to claim 10, wherein, the touch driving electrodes and the touch sensing electrodes are diamond-shaped electrodes, interdigitated electrodes or strip-shaped electrodes.

19. The display device according to claim 10, wherein, common electrodes are provided at the gap of the common electrode layer between the touch sensing electrodes and the touch driving electrodes, and are insulated from the touch sensing electrodes and the touch driving electrodes.

* * * * *